United States Patent [19]

Murata

[11] Patent Number: 5,452,199

[45] Date of Patent: Sep. 19, 1995

[54] MULTIFUNCTION MACHINE MODULE

[75] Inventor: Satoshi Murata, Tsukuba, Japan

[73] Assignees: Agency of Industrial Science & Technology; Ministry of International Trade & Industry, both of Tokyo, Japan

[21] Appl. No.: 279,850

[22] Filed: Jul. 26, 1994

[30] Foreign Application Priority Data

Jul. 26, 1993 [JP] Japan .................. 5-203641

[51] Int. Cl.⁶ ............................. G06F 19/00
[52] U.S. Cl. ................... 364/131; 29/703; 364/512; 428/33
[58] Field of Search ............. 364/130, 131–136, 364/400, 138, 139, 512, 505; 428/900, 33, 53; 29/701, 703, 281.5, DIG. 95

[56] References Cited

U.S. PATENT DOCUMENTS

| | | | |
|---|---|---|---|
| 3,860,803 | 1/1975 | Levine | 364/512 X |
| 5,122,971 | 6/1992 | Kamejima et al. | 364/512 |
| 5,225,987 | 7/1993 | Thompson | 364/512 X |

*Primary Examiner*—Joseph Ruggiero
*Attorney, Agent, or Firm*—Oblon, Spivak, McClelland, Maier & Neustadt

[57] ABSTRACT

A multifunction machine module includes an upper layer member having a plurality of equiangularly spaced projecting arms, a middle layer member shaped identically with the upper layer member and, a lower layer member shaped identically with the upper layer member. The upper, middle and lower layer members are coaxially stacked with the upper and lower layer members angularly aligned, the middle layer member is offset by one-half pitch from the upper layer member and the projecting arms of the upper and lower layer members are spaced to permit a projecting arm of the middle layer member of another identically configured module to be inserted between them, first connector is provided on the projecting arms of the upper and lower layer members. A second connector is provided on the projecting arms of the middle layer member. A data processor sends connection signals to the first connector on the projecting arms for producing attractive or repulsive forces between a projecting arm of the middle layer member and projecting arms of the upper and lower layer members of another module. A data exchange unit is provided on the upper, middle and lower layer members and connected with the data processor for communicating with other modules connected with the module by the connectors.

6 Claims, 6 Drawing Sheets

MULTIFUNCTION MACHINE MODULE

BACKGROUND OF THE INVENTION

1. Field of the Invention

This invention relates to a multifunction machine module connectable with like modules for configuring a machine, and more particularly to such a multifunction module which is independently able without outside assistance to configure various desired machine systems by connecting with other multifunction modules of identical structure and by varying and undoing the connection.

2. Description of the Prior Art

When various machines are to be configured by connecting, disconnecting and reconnecting identically structured machine elements, the connection, disconnection and reconnection thereof is ordinarily accomplished with outside assistance. In some situations, however, it is difficult to provide the required outside assistance because the machine is inaccessible, as in the case of a machine inside an orbiting unmanned artificial satellite or a small medical device embedded in a patient's body. Since the difficulty of connecting, disconnecting and reconnecting the machine elements prevents proper maintenance and self-repair of the machine, the prior art machine elements cannot be applied in such circumstances.

The object of the invention is therefore to provide a multifunction machine module capable of connecting with like modules to configure a desired machine system independently without outside assistance.

SUMMARY OF THE INVENTION

For achieving this object the invention provides a multifunction machine module comprising:

an upper layer member having a plurality of projecting arms projecting from a common center at equal angular intervals, a middle layer member having a plurality of projecting arms shaped identically with those of the upper layer member, a lower layer member having a plurality of projecting arms shaped identically with those of the upper layer member, means for connecting the upper, middle and lower layer members as coaxially stacked with the upper and lower layer members in the same angular phase and the middle layer member in an angular phase offset by one-half pitch from the upper layer member and with aligned pairs of projecting arms of the upper and lower layer members spaced by a distance permitting a projecting arm of the middle layer member of another identically configured module to be inserted between them, connection means provided on each projecting arm of the upper layer member and each projecting arm of the lower layer member for selectively producing an attractive force and a repulsive force between each aligned pair of projecting arms of the upper and lower layer members and a projecting arm of the middle layer member of another identically configured module inserted between them, connection means provided on each projecting arm of the middle layer member for selectively producing an attractive force and a repulsive force between the projecting arm of the middle layer member and an aligned pair of projecting arms of the upper and lower layer members of another identically configured module between which it is inserted, a data processor provided on the upper surface of the upper layer member for sending connection signals to the connection means on the projecting arms, and data exchange means provided on the upper, middle and lower layer members and connected with the data processing means for communicating with other identically configured modules connected with the module by the connection means.

When a projecting arm of the middle layer member of another module is inserted between projecting arms of upper and lower layer members of the module and is connected with the module by the connecting means, the two modules are connected, and when the connection is broken (undone) by the connection means, the two modules are disconnected. In addition, the connection means on one or both of the projecting arms adjacent to the projecting arm currently connected can be operated to conduct module rotation and movement.

These operations are conducted based on commands from the data processors, while data exchange between adjacent multifunction modules is conducted between the projecting arms of the upper and lower layer members of one multifunction module and a projecting arm of the middle layer member of another multifunction module.

A module is therefore able, without assistance from the outside, to connect with a plurality of desired other modules, to disconnect from the other modules and vary its connection with other modules, whereby it is possible for a plurality of modules to automatically connect into a prescribed configuration for constituting a machine system.

The above and other features of the present invention will become apparent from the following description made with reference to the drawings.

BRIEF EXPLANATION OF THE DRAWINGS

FIG. 5(*a*) is a diagram showing how two modules connect.

FIG. 5(*b*) is a diagram showing two separated modules.

FIGS. 6(*a*), 6(*b*) and 6(*c*) are diagrams showing how two modules move by rotating.

FIG. 8(*a*) is a diagram showing how multiple modules connect to form a rigid rod.

FIG. 8(*b*) is a diagram showing how multiple modules connect to form a flexible rod.

DESCRIPTION OF THE PREFERRED EMBODIMENTS

Figure 1:
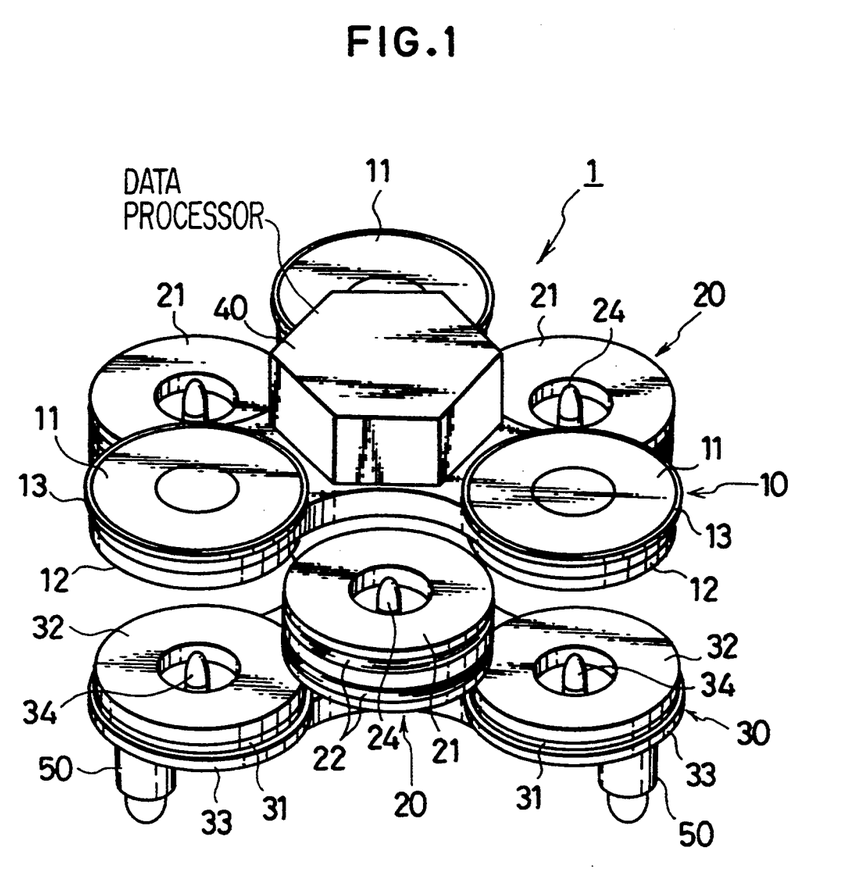
FIG. 1 is a perspective view of an embodiment of the multifunction machine module according to this invention.
Figure 2:
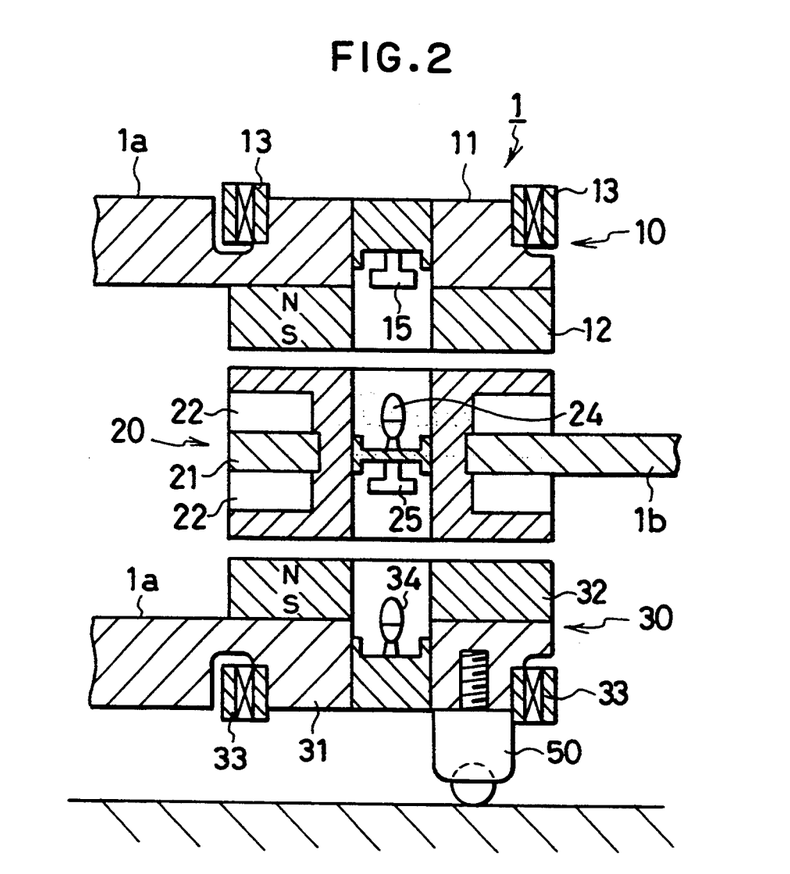
FIG. 2 is a magnified view of an essential portion of two connected modules showing how they connect.
Figure 3:
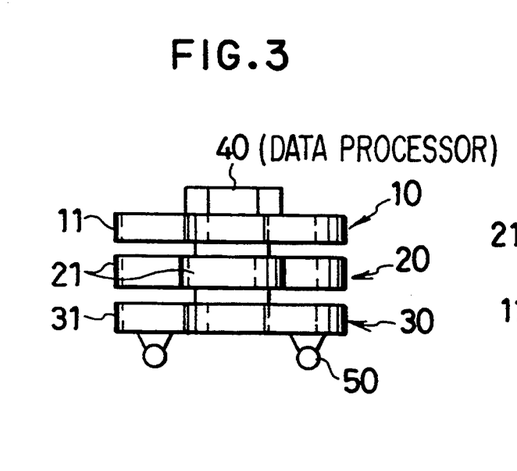
FIG. 3 is a schematic side view of the module of FIG. 1.
Figure 4:
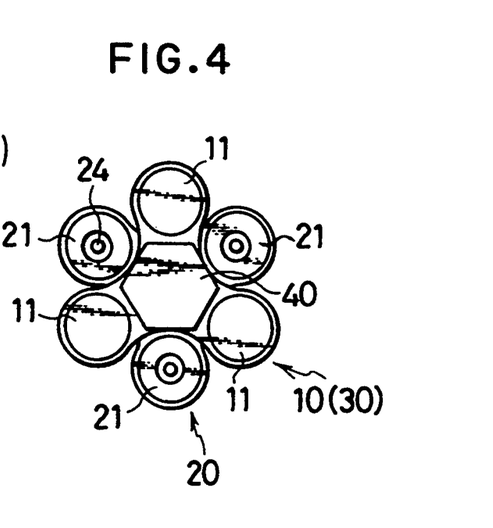
FIG. 4 is a plan view of the module of FIG. 3.

An embodiment of the multifunction machine module according to this invention is illustrated in FIGS. 1 to 4. As can be seen in FIGS. 1 and 3, the multifunction machine module 1 comprises an upper layer member 10, a middle layer member 20 and a lower layer member 30, which are connected with each other, a data processor 40 mounted on top of the aforesaid three layer members, and ball casters 50 mounted on the bottom of the lower layer member 30.

In the illustrated embodiment, the upper layer member 10 has three projecting arms 11 connected at their inner ends and extending at 120° intervals. The lower layer member 30 is identically configured with three projecting arms 31. Each of the projecting arms 11 is provided with a permanent magnet 12 and each of the projecting arms 31 are permanent magnet is provided with a permanent magnet 32 facing one of the permanent magnets 12. The permanent magnets 12, 32 are members of a connecting means explained later.

The middle layer member 20, which is configured similarly to the upper and lower layer members 10 and 30, has three projecting arms 21 connected at their inner ends and extending at 120° intervals. Each of the projecting arms 21 is provided near its tip with a solenoid 22 serving as a member of a connecting means in conjunction with opposing permanent magnets 12, 32 of another identical module.

The upper, middle and lower layer members 10, 20 and 30 are coaxially stacked and connected such that the projecting arms 11 of the upper layer member 10 and the projecting arms 31 of the lower layer member 30 are vertically aligned and that the projecting arms 21 of the middle layer member 20 are positioned half way between the projecting arms of the upper and lower layer members. In other words, the upper and lower layer members 10, 30 have the same angular phase around their common central axis while the middle layer member 20 is out of phase therewith by one-half pitch (60°).

The upper, middle and lower layer members can be connected by the use of gear-latch combinations, electrostatic charging or the like.

Each pair of aligned projecting arms 11, 31 of the upper and lower layer members 10, 30 are spaced to permit a projecting arm 21 of the middle layer member 20 of another identically configured multifunction module 1 to be inserted between them and the permanent magnets 12, 32 are attached to the projecting arms 11, 31 of the upper and lower layers member 10, 30 with opposite poles facing each other. The solenoid 22 attached near the tip of each projecting arm 21 of the middle layer member 20 is arranged such that current can be selectively passed through it in either direction. When it is inserted between a pair of permanent magnets 12, 32 of the upper and lower layer members 10, 30, therefore, its polarity can be matched to or be made the opposite from that of the permanent magnets by appropriately selecting the direction of current flow. The permanent magnets 12, 32 and the solenoid 22 thus constitute a connection means for establishing and breaking the connection between adjacent modules.

More specifically, when current is passed through the solenoid 22 in the direction causing its upper and lower poles to assume the opposite polarity from that of the opposing poles of the permanent magnets 12, 32, the attractive force produced between the solenoid 22 and the permanent magnets 12, 32 connects the adjacent multifunction modules. When current is passed in the opposite direction, the repulsive force produced separates the adjacent multifunction modules.

The peripheries of the projecting arms 11 of the upper layer member 10 are provided with bearings 13 and the those of the projecting arms 31 of the lower layer member 30 with bearings 33 for reducing friction when the module comes in contact with another module. The ball casters 50 are mounted on the underside of the lower layer member 30 near the tips of the projecting arms 31 and are adapted to roll in any direction for enabling movement and rotation of the module 1.

The data processor 40 is mounted at the center of the upper surface of the upper layer member 10. It comprises a CPU, a communication control circuit, a coil driving circuit and the like. Thus each multifunction machine module has its own data processing capability. The communication control circuit controls communication for exchanging data with adjacent modules. This communication is conducted through optical transmitters 24 (light-emitting diodes or the like) provided in center holes of the solenoids 22 on the projecting arms 21 of the middle layer member 20 and similar optical transmitters 34 provided in center holes of the permanent magnets 32 on the projecting arms 31 of the lower layer member 30. The transmitters 24, 34 are arranged to emit signals upward. In addition, as shown in FIG. 2, receivers 15 are provided in the center holes of the permanent magnets 12 on the projecting arms 11 of the upper layer member 10 for receiving the signals emitted by the transmitters 24 and receivers 25 are provided in the center holes of solenoids 22 on the projecting arms 21 of the middle layer member 20 for receiving the signals emitted by the optical transmitters 34. The transmitters and receivers are connected with the aforesaid communication control circuit.

When a module 1a and an adjacent module 1b connect as shown in FIG. 2, therefore, data can be transmitted from an optical transmitter 34 of the module 1a to a receiver 25 of the module 1b and from a transmitter 24 of the module 1b to a receiver 15 of the module 1a. Means is thus established for exchanging data between the modules.

On the other hand, the coil driving circuit selectively passes current through the solenoids 22 in whichever direction is specified by the CPU, thus driving the aforesaid connection means to connect or disconnect.

The easiest way to supply the module with electrical power is to equip it with a solar cell or the like. In cases where it is difficult to equip the module with a cell or battery for supplying power, some other method such as that illustrated in FIG. 12 can be used.

Figure 12:
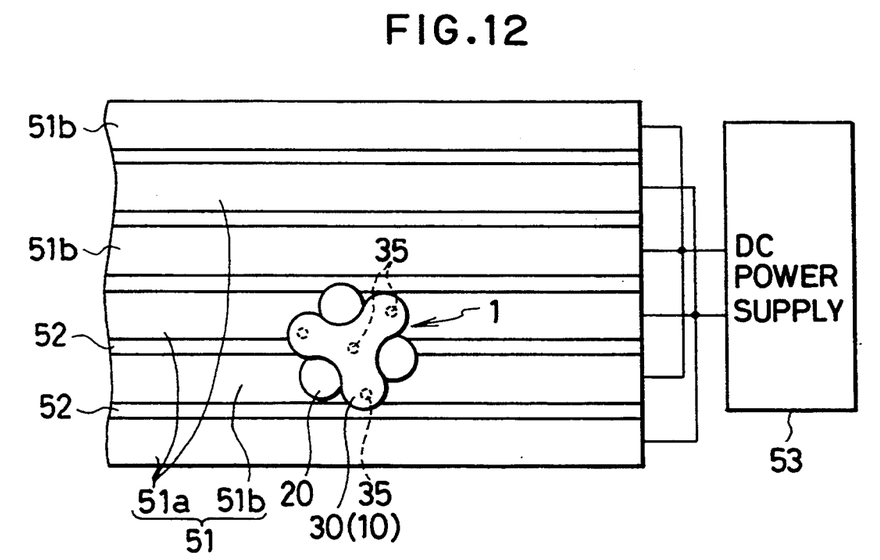
FIG. 12 is diagram showing an example of how electrical power is supplied to a module.

In the illustrated arrangement, four contact points 35 are provided on the bottom of the lower layer member 30, one at its center and on each of its three projecting arms 31, to make contact with the supporting surface. The supporting surface is covered with a plurality of alternate electrode strips 51 (51a, 51b.) separated by insulation strips 52. The electrode strips 51a are of a prescribed width and connected with one terminal of a DC power supply 53, while the electrode strips 51b are of the same width and connected with the other terminal of the DC power supply 53.

Define the length of one side of the equilateral triangle formed by the three contact points 35 provided one on each of the projecting arms 31 of the lower layer member 30 is as l, the width of the electrode strips 51 as H and the width of the insulation strips 52 as h. Then, if the values of the widths H and h are selected to satisfy the following inequalities (1) and (2), it is possible to ensure that at all times at least one of the four contact points 35 will be in contact with an electrode strip 51a of one polarity and at least one in contact with an adjacent electrode strip 51b of the opposite polarity thereby enabling constant supply of direct current to the module.

$$H + 2h < l \times \sqrt{3}/2 \quad (1)$$

$$H > l/\sqrt{3} \quad (2)$$

A plurality of the aforesaid multifunction machine modules connect to form a desired machine system. Since each is equipped with its own data processing capability and means for connecting with other modules, the modules are able, through data exchange and without outside assistance, to connect themselves with each other, disconnect themselves from each other and reconnect themselves to each other so as to automatically interconnect large numbers of modules into desired configurations. These operations are described below.

(1) Module Connection and Disconnection

Figure 5A:
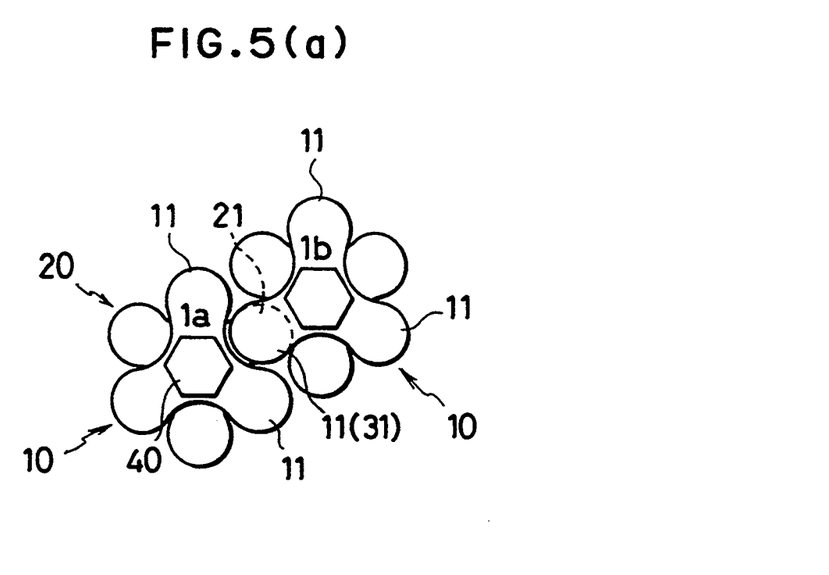
Figure 5B:
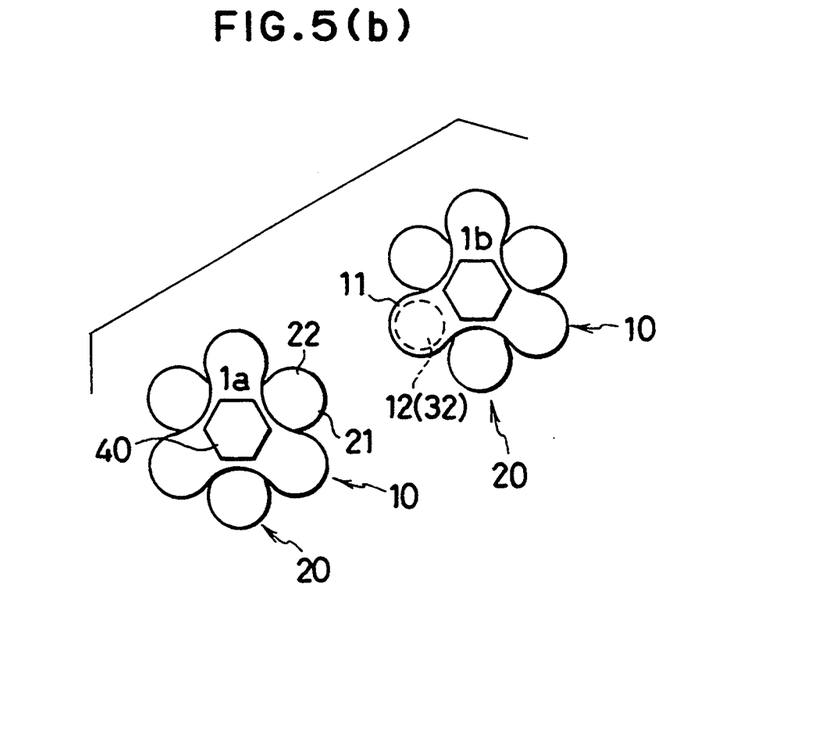

FIG. 5(a) shows a module 1a and a module 1b positioned next to each other on a horizontal surface. If the data processor 40 of the module 1a produces a signal for causing the upper and lower poles of the solenoid 22 on the projecting arm 21 of the middle layer member 20 which projects toward the module 1b to assume polarities which are opposite from the polarities of the opposing poles of the permanent magnets 12, 32 of the module 1b located above and below it, an attractive force will be produced between the permanent magnets 12, 32 and the solenoid 22, whereby the modules 1a, 1b will connect, while if the solenoid 22 is energized so that its poles have the same polarity as those of the opposing permanent magnets 12, 32, the resulting force of repulsion between the permanent magnets 12, 32 and the solenoid 22 will cause the modules 1a, 1b to disconnect, as shown in FIG. 5(b). When the adjacent modules 1a, 1b are connected as shown in FIG. 5(a), each is free to rotate with respect to the other about the point of connection by an angle of up to about 120°.

Although the aforesaid operations are achieved with the ball casters 50 merely supporting the modules, it is also possible to provide the casters with positive drive means for enabling the modules to be moved about as desired. Since contact between the modules 1a, 1b is through the bearings 13, 33 provided on the projecting arms 11, 31, the modules can move easily with little friction between them.

(2) Module Rotational Movement

Figure 6A:
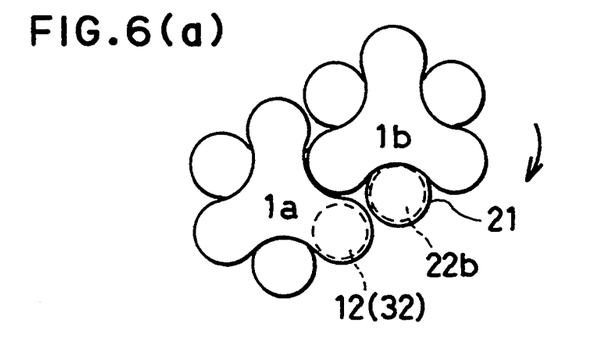
Figure 6B:
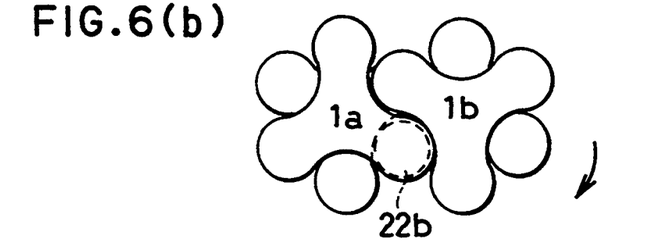
Figure 6C:
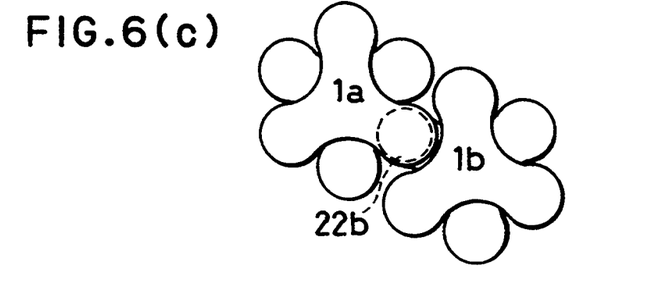

When modules 1a, 1b are connected as shown in FIG. 6(a) and the module 1b is to be rotated in the direction indicated by the arrow, the solenoid 22b on the projecting arm 21 of the module 1b is energized. As a result, an attractive force is produced between the solenoid 22b and the permanent magnets 12, 32 of the module 1a that are nearest the solenoid 22b, whereby the module 1b rotates about the original (preexisting) connection point, as shown in FIG. 6(b). For further rotating the module 1b., the polarity of solenoid 22b at the original point of connection with the module 1a is reversed for producing a repulsive force with respect to the permanent magnets of the module 1b. The module 1b is thus rotated about the connection point at the newly connected solenoid 22b, whereby the connection becomes as shown in FIG. 6(c).

(3) Data Exchange Between Modules

The energization sequence of the solenoids 22 required for module connection, disconnection and rotation can be appropriately established. It can, for example, be decided for each module in accordance with a connection control program stored in the data processors 40 of the individual modules. For data exchange between adjacent modules, the data processor 40 of one of the connected modules emits a signal through a transmitter 24 or 34 and the signal is received by a receiver 15 or 25 of the other module and sent to its data processor 40.

Either the data processors 40 energize their solenoids 22 in the required sequence in accordance with a prescribe program or the solenoids are energized to conduct required operations based on commands from an adjacent module.

(4) Module Working Operations

Working operations conducted by the modules on the basis of the aforesaid basic operations will now be explained.

Figure 7:
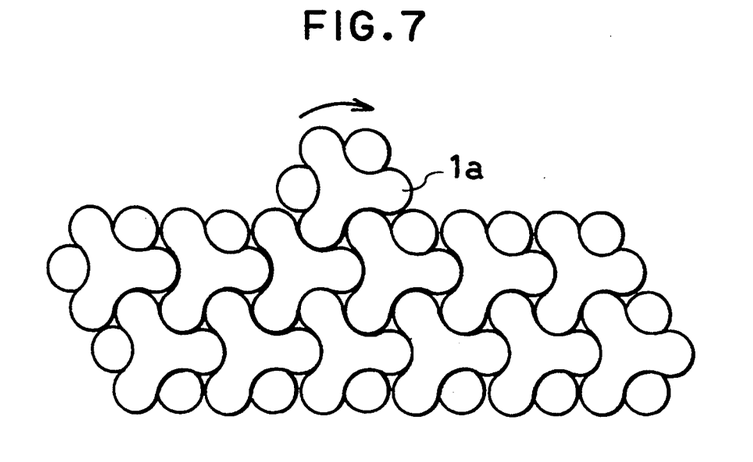
FIG. 7 shows how a module is transported.

(i) Module transportation As shown in FIG. 7, a module 1a is transported over the length two rows of connected modules by successively rotating it along the outer side of one of the two rows.

Figure 8A:
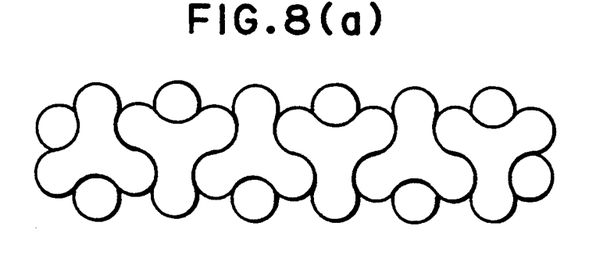
Figure 8B:
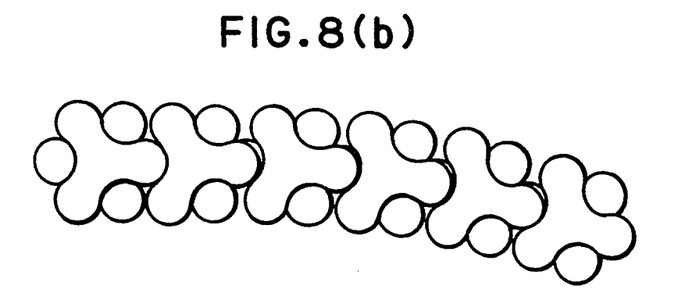

(ii) Forming rigid and flexible module configurations When multiple modules are connected in a row, a relatively rigid rod structure can be obtained by energizing the solenoids at the connecting points of adjacent modules to produce attractive forces which connect them at two connection points. This is shown in FIG. 8(a). On the other hand, as shown in FIG. 8(b), a relatively flexible rod structure can be obtained by connecting a row of modules by energizing one solenoid of each to produce an attractive force and energizing the solenoids on the opposite sides of this solenoid to produce repulsive forces. The modules connected in this manner can function as an actuator.

Figure 9:
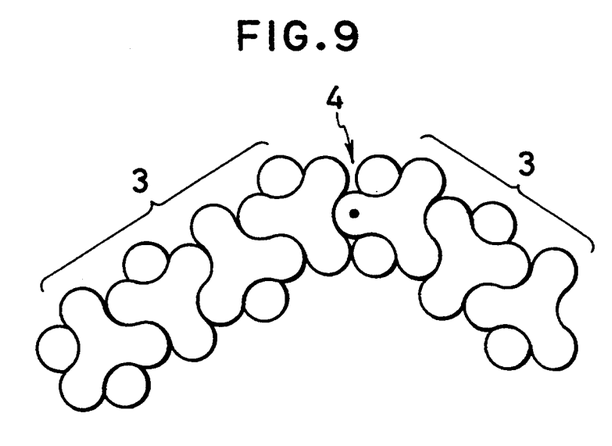
FIG. 9 is a diagram showing how multiple modules connect to form a rotating joint.

(iii) Forming a rotating joint As shown in FIG. 9, a rotating joint 4 can be formed by joining a pair of rigid rod structures 3, 3 of the type shown in FIG. 8(a) such that only one solenoid at the connection point between them is energized to provide a rotatable connection.

Figure 10:
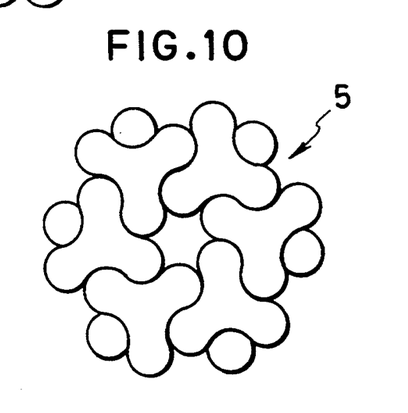
FIG. 10 is a diagram showing how multiple modules connect to form a six-member ring.

(iv) Forming a tight hexagonal ring As shown in FIG. 10, six modules can be connected into a rigid circle to form a tight hexagonal ring 5. This hexagonal configuration can be repeated to produce a rigid flat plate.

Figure 11:
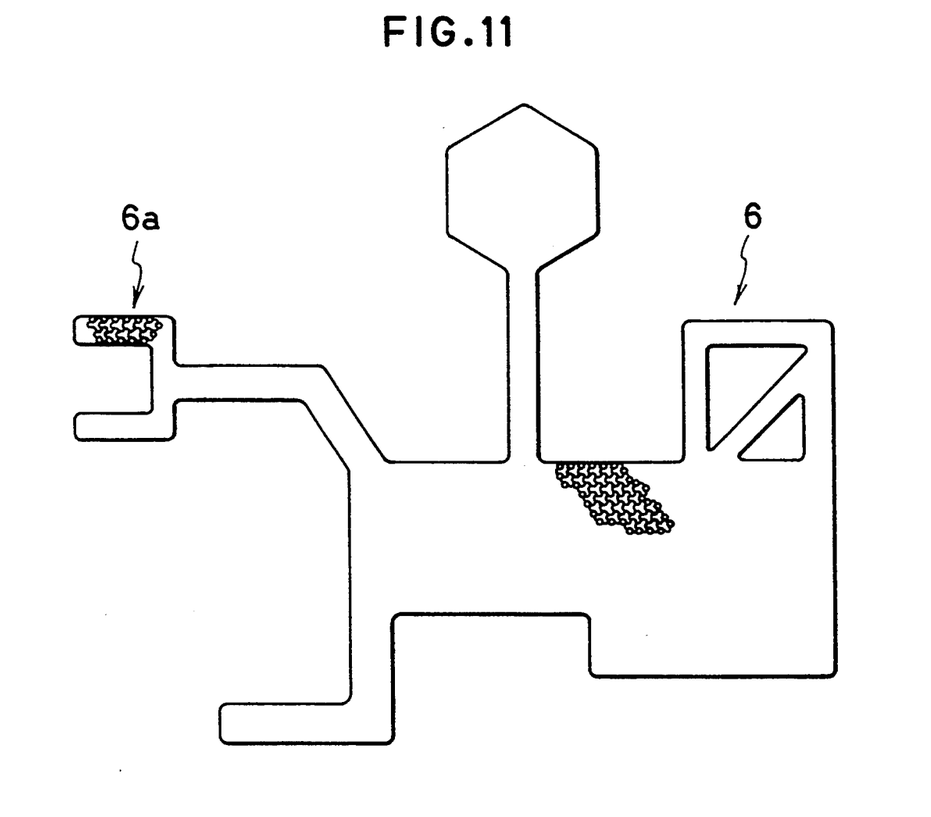
FIG. 11 is a diagram showing an example of how multiple modules connect to configure a two-dimensional structure.

(v) Forming a two-dimensional structure As shown schematically by the outline in FIG. 11, a complexly shaped two-dimensional structure 6 can be built by connecting a large number of modules. If, for example, the tip 6a of a two-prong portion constituting a grasping member should break, it can be restored to its initial shape by disconnecting and discarding the broken portion and then using the method described in (i) above to transport modules from a nonfunctioning part of the structure 6 for replacing the discarded modules. Moreover, by combining the module connection, disconnection and rotation operations described in the foregoing, the two-dimensional configuration can be modified as desired, making it possible, for example, to open and close the two-prong portion in a grasping operation.

While the aforesaid embodiment was explained with respect to the case where the means for connecting adjacent modules uses permanent magnets and solenoids for producing magnetic forces, the invention is not limited to this arrangement. Specifically, arrangements which use other forces such as electrostatic forces can also be employed.

Further, although an embodiment was explained in which each of the upper, middle and lower layer members has three projecting arms, it is alternatively possible for each layer member to have two projecting arms or four or more projecting arms. While the projecting arms are shown to be rounded in the illustrated embodiment, they can instead be polygonal. Moreover, while for simplifying the explanation the upper, middle and lower layer members were described as being separate members connected together to form the module, they do no have to be separate members but can be formed integrally from the start.

Since, as was explained in the foregoing, the individual multifunction machine modules according to the invention are equipped with their own data processing capability and the capability to connect with and disconnect from other multifunction modules, the modules are able, through data exchange and without outside assistance, to connect themselves with each other, disconnect themselves from each other and reconnect themselves to each other so as to automatically interconnect large numbers of modules into desired configurations.

Japanese Patent Application No. 5-203641 filed Jul. 26, 1993 is hereby incorporated by reference.

What is claimed is:

1. A multifunction machine module comprising:
   an upper layer member having a plurality of projecting arms projecting from a common center at equal angular intervals,
   a middle layer member having a plurality of projecting arms shaped identically with those of the upper layer member,
   a lower layer member having a plurality of projecting arms shaped identically with those of the upper layer member,
   means for connecting the upper, middle and lower layer members as coaxially stacked with the upper and lower layer members in the same angular phase and the middle layer member in an angular phase offset by one-half pitch from the upper layer member and with aligned pairs of projecting arms of the upper and lower layer members spaced by a distance permitting a projecting arm of the middle layer member of another identically configured module to be inserted between them,
   connection means provided on each projecting arm of the upper layer member and each projecting arm of the lower layer member for selectively producing an attractive force and a repulsive force between each aligned pair of projecting arms of the upper and lower layer members and a projecting arm of the middle layer member of another identically configured module inserted between them,
   connection means provided on each projecting arm of the middle layer member for selectively producing an attractive force and a repulsive force between the projecting arm of the middle layer member and an aligned pair of projecting arms of the upper and lower layer members of another identically configured module between which it is inserted,
   a data processor provided on the upper surface of the upper layer member for sending connection signals to the connection means on the projecting arms, and
   data exchange means provided on the upper, middle and lower layer members and connected with the data processing means for communicating with other identically configured modules connected with the module by the connection means.

2. A multifunction module according to claim 1, wherein the connection means provided on the projecting arms of the upper and lower layer members are permanent magnets.

3. A multifunction module according to claim 1, wherein the connection means provided on the projecting arms of the middle layer member are solenoids.

4. A multifunction module according to claim 1, wherein the data exchange means are optical communication transmitters and receivers.

5. A multifunction module according to claim 1, wherein the data processor includes a central processing unit, a communication control circuit and a coil driving circuit.

6. A multifunction module according to claim 1, further comprising ball casters provided on the lower layer member.

* * * * *